United States Patent
Liu et al.

(10) Patent No.: US 12,557,111 B2
(45) Date of Patent: Feb. 17, 2026

(54) RESOURCE DETERMINATION METHOD AND DEVICE, STORAGE MEDIUM AND ELECTRONIC DEVICE

(71) Applicant: ZTE Corporation, Shenzhen (CN)

(72) Inventors: Wenhao Liu, Shenzhen (CN); Youxiong Lu, Shenzhen (CN); Ting Miao, Shenzhen (CN); Weimin Xing, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 438 days.

(21) Appl. No.: 17/635,101

(22) PCT Filed: Jun. 29, 2020

(86) PCT No.: PCT/CN2020/099016
§ 371 (c)(1),
(2) Date: Feb. 14, 2022

(87) PCT Pub. No.: WO2021/027416
PCT Pub. Date: Feb. 18, 2021

(65) Prior Publication Data
US 2022/0295456 A1    Sep. 15, 2022

(30) Foreign Application Priority Data
Aug. 15, 2019    (CN) .......................... 201910755800.7

(51) Int. Cl.
*H04W 72/04*    (2023.01)
*H04W 28/16*    (2009.01)
(Continued)

(52) U.S. Cl.
CPC ........... *H04W 72/23* (2023.01); *H04W 28/16* (2013.01); *H04W 72/53* (2023.01)

(58) Field of Classification Search
CPC ..... H04W 72/23; H04W 72/53; H04W 72/20; H04W 72/0446; H04W 28/16;
(Continued)

(56) References Cited

U.S. PATENT DOCUMENTS

2019/0191433 A1*   6/2019  Park ..................... H04L 27/2666
2020/0107362 A1*   4/2020  Qi ........................ H04W 52/362
(Continued)

FOREIGN PATENT DOCUMENTS

CN    102763472 A    10/2012
CN    109495223 A     3/2019
(Continued)

OTHER PUBLICATIONS

R1-1900478, Intel Corporation, Resource allocation for NR IAB, 3GPP TSG RAN WG1 Ad-Hoc Meeting 1901, Jan. 21-Jan. 25, 2019 (Year: 2019).*
(Continued)

*Primary Examiner* — Mahbubul Bar Chowdhury
(74) *Attorney, Agent, or Firm* — CANTOR COLBURN LLP

(57) ABSTRACT

A resource determination method and device, a storage medium and an electronic device are provided. The method includes the following operations. A first node determines availabilities of first-type resources of one or more slots according to an agreed rule and/or according to a resource configuration signaling. The technical problem in the related art that the availability of resources is difficult to determine is solved.

20 Claims, 2 Drawing Sheets

A first node determines availabilities of first-type resources of one or more slots according to an agreed rule and/or according to a resource configuration signaling — S102

(51) Int. Cl.
*H04W 72/23* (2023.01)
*H04W 72/53* (2023.01)

(58) Field of Classification Search
CPC .. H04W 92/20; H04W 84/047; H04L 5/0053; H04L 5/0078
See application file for complete search history.

(56) References Cited

U.S. PATENT DOCUMENTS

| | | | |
|---|---|---|---|
| 2020/0145965 A1* | 5/2020 | Luo | H04L 5/0032 |
| 2020/0229271 A1* | 7/2020 | You | H04W 72/23 |
| 2021/0029729 A1* | 1/2021 | Abedini | H04L 5/0094 |
| 2021/0036765 A1* | 2/2021 | Keskitalo | H04W 72/0446 |
| 2021/0153189 A1* | 5/2021 | Jo | H04W 72/0453 |
| 2021/0250941 A1* | 8/2021 | Tiirola | H04W 40/22 |
| 2021/0298000 A1* | 9/2021 | Park | H04W 72/23 |
| 2021/0367660 A1* | 11/2021 | Jo | H04B 7/15542 |
| 2021/0368481 A1* | 11/2021 | Jo | H04W 72/21 |
| 2021/0400661 A1* | 12/2021 | Harada | H04W 72/23 |
| 2022/0015093 A1* | 1/2022 | Ying | H04B 7/15542 |
| 2022/0078788 A1* | 3/2022 | Tiirola | H04W 72/0446 |
| 2022/0167331 A1* | 5/2022 | Huang | H04W 72/20 |
| 2022/0167364 A1* | 5/2022 | Kurita | H04W 72/29 |
| 2022/0191832 A1* | 6/2022 | Yokomakura | H04W 72/23 |
| 2022/0201656 A1* | 6/2022 | Kurita | H04W 72/1263 |
| 2022/0217661 A1* | 7/2022 | Yokomakura | H04B 7/155 |
| 2023/0345553 A1* | 10/2023 | Maya | H04W 56/0045 |

FOREIGN PATENT DOCUMENTS

| | | | |
|---|---|---|---|
| CN | 111083740 A | | 4/2020 |
| GB | 2554661 A | | 4/2018 |
| KR | 20190072381 A | | 6/2019 |
| WO | 2017041615 A1 | | 3/2017 |
| WO | 2017133709 A1 | | 8/2017 |
| WO | 2018126823 A1 | | 7/2018 |
| WO | 2019140076 A1 | | 7/2019 |

OTHER PUBLICATIONS

R1-1907155, AT&T, Mechanisms for supporting access and backhaul link multiplexing, 3GPP TSG RAN WG1 #97, Reno, USA, May 13-17, 2019 (Year: 2019).*
AT&T, Qualcomm, "Summary #5 of 7.2.3.2—Mechanisms for resource multiplexing among backhaul and access links", 3GPP TSG RAN WG1 Meeting #98bis Chongqing, China, Oct. 14-20, 2019, R1-1911651.
International Search Report for corresponding application PCT/CN2020/099016 filed Jun. 29, 2020; Mail date Sep. 16 Sep. 2020.
NTT Docomo, Inc, "Mechanisms for resource multiplexing among backhaul and access links", 3GPP TSG RAN WG1 #97 Reno, Nevada, USA, May 13-17, 2019, R1-1906203.
ZTE, Sanechips, "Resource multiplexing between backhaul and access links", 3GPP TSG RAN WG1 #97, Reno, USA, May 13-17, 2019, R1-1906491.
AT&T, Mechanisms for supporting access and backhaul link multiplexing, 3GPP TSG RAN WG1 #97 R1-1907155, Reno, USA, May 13-17, 2019.
European Search Report for corresponding application EP20852451; Report dated Aug. 12, 2022.
Intel Corporation, "Resource allocation for NR IAB", 3GPP TSG RAN WG1 Ad-Hoc Meeting 1901 R1-1900478, Jan. 21-Jan. 25, 2019 Taipei, Taiwan.
Korean Office Action; Application No. 10-2022-7008689; Filing Date: Mar. 15, 2022; date of mailing: Sep. 9, 2025; 12 pages.

* cited by examiner

Fig. 1
A first node determines availabilities of first-type resources of one or more slots according to an agreed rule and/or according to a resource configuration signaling — S102
Fig. 2
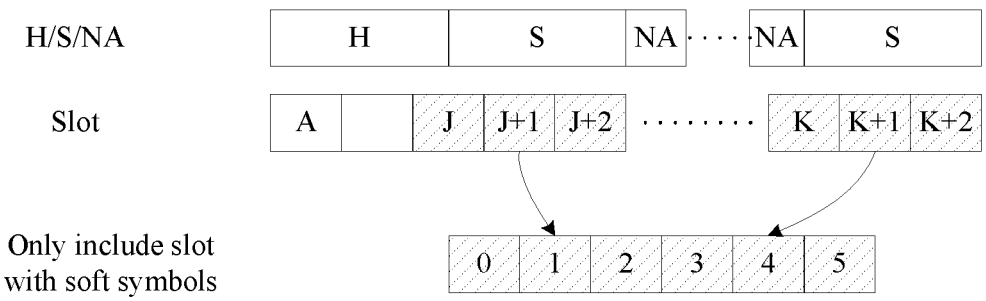
Fig. 3
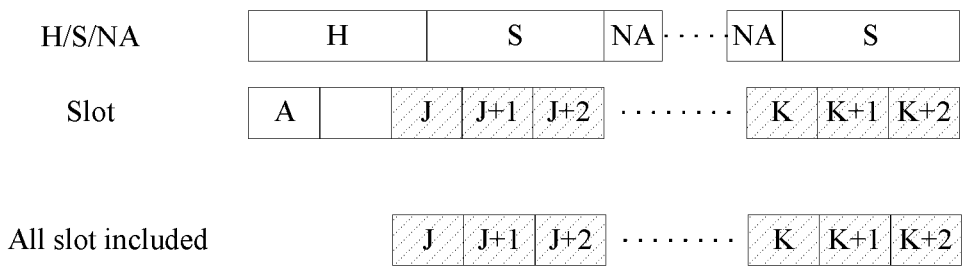
Fig. 4
A direction-based soft source availability combination of N slots with soft symbols
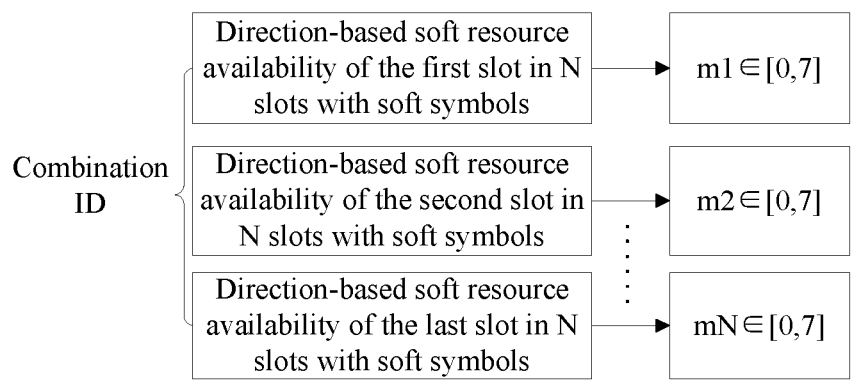

| Slot_NCP | 0 | 1 | 2 | 3 | 4 | 5 | 6 | 7 | 8 | 9 | 10 | 11 | 12 | 13 |
|---|---|---|---|---|---|---|---|---|---|---|---|---|---|---|

| Slot_ECP | 0 | 1 | 2 | 3 | 4 | 5 | 6 | 7 | 8 | 9 | 10 | 11 |
|---|---|---|---|---|---|---|---|---|---|---|---|---|

RESOURCE DETERMINATION METHOD AND DEVICE, STORAGE MEDIUM AND ELECTRONIC DEVICE

CROSS REFERENCE

This application is a National Stage Filing of the PCT International Application No. PCT/CN2020/099016 filed on Jun. 29, 2020, which claims priority to Chinese Application No. 201910755800.7 filed on Aug. 15, 2019, the entirety of which is herein incorporated by reference.

TECHNICAL FIELD

The present disclosure relates to the field of communications, and more particularly, to a resource determination method and device, a storage medium and an electronic device.

BACKGROUND

One potential technology for future network deployment is to support wireless backhaul to enable flexible and dense deployment of a New Radio access technology cell (NR cell) without the deployment of transport networks to scale. An Integrated Access and Backhaul node (IAB node) is identified to have functional units of a Mobile Terminal (MT) and a Distributed Unit (DU). The MT is a unit serving as a UE function in the IAB node, and the DU unit serves as a base station for serving a child node.

FIG. 1 is a schematic diagram of relationships and links between nodes in an IAB network in the related art. As shown in FIG. 1, three nodes from top to bottom are respectively referred to as a parent node, a child node and a node served by the child node. The node served by the child node may be a terminal or an IAB node. A link between the child IAB node and the parent node is referred to as a backhaul link, and is further divided into a backhaul Downlink (DL) and a backhaul Uplink (UL) according to a transmission direction. A link between the child node and the node served by the child node is referred to as an access link, and is further divided into an access DL and an access UL according to a transmission direction.

The link attribute is determined based on the relative relationships and roles of the nodes. If the node served by the child node in FIG. 1 is a normal terminal, the link is an access link from the perspective of the served terminal. If the node served by the child node is an IAB node, the link is a backhaul link from the perspective of this IAB node.

In Rel-14, the backhaul and access links of a Relay node are subjected to time division multiplexing. However, for NR IAB networks, due to the introduction of multi-hop relay, the relationship regarding resource configuration in 3gpp considers the resource configuration situation from the perspective of two functional units (DU and MT) of the IAB node, and considers, with high priority, the resource configuration situation of DU and MT time division. However, the resource configuration of the DU should ensure forward compatibility (FDM/SDM). A DU resource is a resource of a DU functional unit of an IAB node serving a child node or a terminal. For example, a DL resource of the DU is a resource of the IAB DU functional unit scheduling the child node or the terminal for downlink transmission.

The resource attributes of the DU are divided into seven types: Hard DL, Hard F, Hard U, Soft DL, Soft F, Soft U, and NA. Hard DL may be directly used for downlink scheduling of an access link of a child node of a DU functional node, and for this segment of resource, the DU does not need to consider the resource allocation situation of an MT. Hard UL and Hard F have the same meaning, i.e., on the resource of Hard attribute, the DU can perform access link uplink/downlink scheduling of the child node without considering the impact on the MT. An NA resource is an unavailable resource for a child DU. The availability of a Soft resource for the child DU needs to be indicated by the parent node, for example, in a case where the Soft resource is indicated as Available by the parent node, the resource is available for the child DU; in a case where Soft UL is indicated as Available, the child DU can use these resources to perform uplink scheduling of a child node or a terminal; and in a case where Soft DL is indicated as Available, the child DU can use these resources to perform downlink scheduling of a child node or a terminal.

Aiming at the above problems in the related art, no effective solution has been proposed yet.

SUMMARY

The present disclosure provides a resource determination method and device, a storage medium and an electronic device, which can solve the technical problem in the related art that the availability of resources is difficult to determine.

According to an embodiment of the present disclosure, a resource determination method is provided, which includes the following operation. A first node determines availabilities of first-type resources of one or more slots according to an agreed rule and/or according to a resource configuration signaling.

According to an embodiment of the present disclosure, a resource indication method is provided, which includes the following operation. A second node determines to indicate availabilities of first-type resources to a first node according to an agreed rule and/or by sending resource configuration signaling to the first node.

According to an embodiment of the present disclosure, a resource determination device is provided, which may be applied to a first node and includes: a first determination module, configured to determine availabilities of first-type resources of one or more slots according to an agreed rule and/or according to a resource configuration signaling.

According to an embodiment of the present disclosure, a resource indication device is provided, which may be applied to a second node and includes: a second determination module, configured to determine to indicate availabilities of first-type resources to a first node according to an agreed rule and/or by sending resource configuration signaling to the first node.

According to another embodiment of the present disclosure, a storage medium is also provided. The storage medium may store a computer program that, when executed, performs the operations in any one of the above method embodiments.

According to yet another embodiment of the present disclosure, an electronic device is also provided, which includes a memory and a processor. The memory stores a computer program.

The processor is configured to execute the computer program to perform the operations in any one of the above method embodiments.

Through the present disclosure, a first node determines availabilities of first-type resources of one or more slots according to an agreed rule and/or according to a resource configuration signaling, thereby solving the technical problem in the related art that the availability of resources is difficult to determine.

BRIEF DESCRIPTION OF THE DRAWINGS

The accompanying drawings described herein are used to provide a further understanding of the present disclosure, and constitute a part of the present disclosure, and the exemplary examples of the present disclosure and the description thereof are used to explain the present disclosure, but do not constitute improper limitations to the present disclosure. In the drawings:

FIG. 1 is a flowchart of a resource determination method according to an embodiment of the present disclosure;

FIG. 2 is a schematic partitioning diagram of a time domain resource attribute of a DU according to an embodiment of the present disclosure;

FIG. 3 is a schematic diagram of an availability indication of Soft resources of consecutive slots in a time domain according to an embodiment of the present disclosure;

FIG. 4 is a schematic combined diagram of resource availability according to an embodiment of the present disclosure;

DETAILED DESCRIPTION

Figures 5, 6:
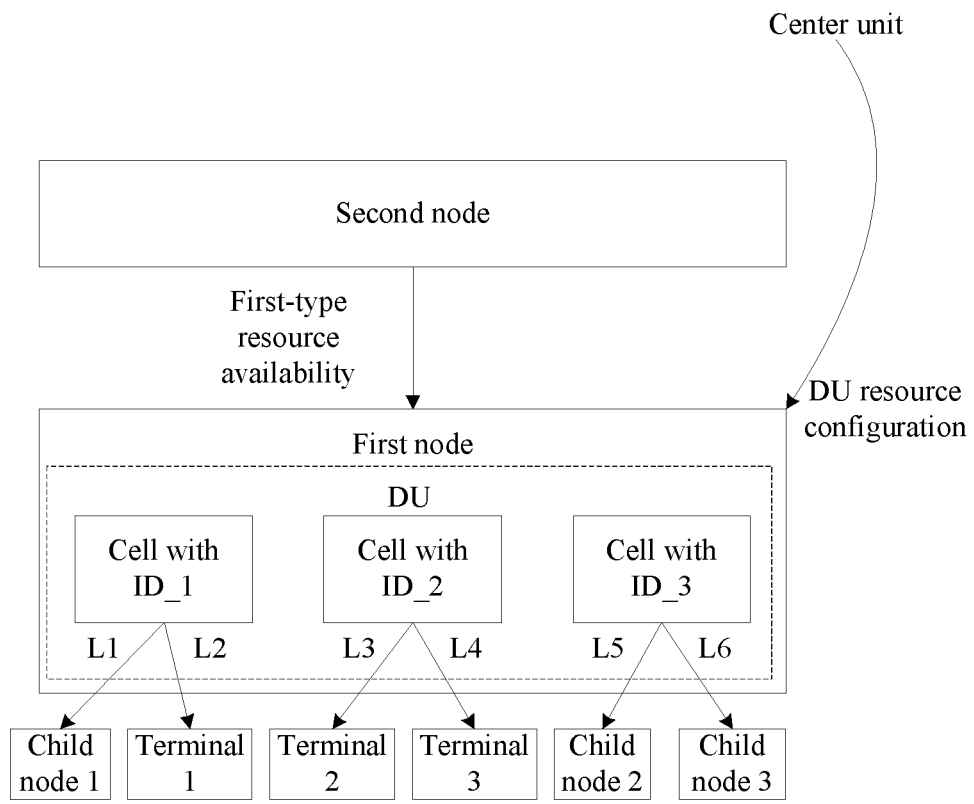
FIG. 5 is a schematic diagram of a corresponding relationship of Orthogonal Frequency Division Multiplexing (OFDM) symbols of an NCP and an ECP according to an exemplary embodiment of the present disclosure.
FIG. 6 is a flow diagram of a second node signaling availabilities of first-type resources according to an exemplary embodiment of the present disclosure.

The present disclosure is described below with reference to the drawings and in conjunction with the examples in detail. It is to be noted that in the case of no conflict, the features in the examples and the examples in the present disclosure may be combined with each other.

It is to be noted that the specification and claims of the disclosure and the terms "first", "second" and the like in the drawings are used to distinguish similar objects, and do not need to describe a specific sequence or a precedence order.

Embodiment 1

A resource determination method is provided in the present embodiment. FIG. 1 is a flowchart of a resource determination method according to an embodiment of the present disclosure. As shown in FIG. 1, the flow includes the following operation.

In operation S102, a first node determines availabilities of first-type resources of one or more slots according to an agreed rule and/or according to a resource configuration signaling.

It is to be noted that the first node in the embodiment of the present disclosure is an IAB node serving as a child node, and the second node is an IAB node serving as a parent node.

In some exemplary implementations, in a case where a second node indicates that a first-type resource is available, the first-type resource is a resource for scheduling at least one child node or terminal of the first node by the first node.

In some exemplary implementations, the resource configuration signaling involved in the embodiment of the present disclosure includes: a first resource configuration signaling and a second resource configuration signaling.

In some exemplary implementations of the embodiment of the present disclosure, the first resource configuration signaling includes at least one of the following: an availability combination of the first-type resources of one or more slots; a first index corresponding to the availability combination; an index of a cell in a cell set corresponding to the first node; an availability combination of the first-type resources of one or more slots for one link of the first node or one link of a cell in a cell set corresponding to the first node; a second index corresponding to one link of an availability combination of the first-type resources of one or more slots for one link of the first node or one link of a cell in a cell set corresponding to the first node; and positions of a cell index, a second index, and a first index of the availability combination in the second resource configuration signaling.

In some exemplary implementations, the availability combination of the first-type resources of one or more slots includes at least one of the following: an intra-slot symbol availability combination of one or more slots under configuration of a Normal Cyclic Prefix (NCP); a third index corresponding to an intra-slot symbol availability combination of one or more slots under configuration of an NCP; an intra-slot symbol availability combination of one or more slots under configuration of an Extended Cyclic Prefix (ECP); a fourth index corresponding to an intra-slot symbol availability combination of one or more slots under configuration of an ECP; an intra-slot transmission direction-based availability combination; and a fifth index corresponding to an intra-slot transmission direction-based availability combination.

It is to be noted that the availability combination of the first-type resources in the embodiment of the present disclosure further includes at least one of the following: invalidation indication, repeat indication, duration indication, and offset indication.

In some exemplary implementations, the availability combination of the first-type resources of one or more slots includes at least one of: the availability combination of the first-type resources of one or more slots corresponding to the first node; the availability combination of the first-type resources of one or more slots of a cell in a cell set corresponding to the first node; and the availability combination of the first-type resources of one or more slots for one link of the first node or one link of a cell in a cell set corresponding to the first node.

In some exemplary implementations of the embodiment of the present disclosure, the second resource configuration signaling is sent by the second node and received by the first node, and is used for indicating the availabilities of the first-type resources.

In some exemplary implementations, the first node extracts an availability combination index from a corresponding position of the second resource configuration signaling, and determines the availabilities of the first-type resources of one or more slots of the first node, or the availabilities of the first-type resources of one or more slots of a cell in a cell set corresponding to the first node, or the availabilities of the first-type resources of one or more slots of one link of the first node or one link corresponding to a cell in a cell set corresponding to the first node. The method further includes at least one of the following. The first node extracts an availability offset from a corresponding position of the second resource configuration signaling, and determines an offset for validation of the availabilities of the first-type resources of one or more slots of the first node, or of the availabilities of the first-type resources of one or more slots of a cell in a cell set corresponding to the first node, or of the availabilities of the first-type resources of one or more slots of one link of the first node or one link corresponding to a cell in a cell set corresponding to the first node.

Alternatively, the first node extracts an availability duration from a corresponding position of the second resource configuration signaling, and determines a duration for validation of the availabilities of the first-type resources of one or more slots of the first node, or of the availabilities of the first-type resources of one or more slots of a cell in a cell set corresponding to the first node, or of the availabilities of the first-type resources of one or more slots of one link of the first node or one link corresponding to a cell in a cell set corresponding to the first node. Alternatively, the first node extracts an availability repeat indication from a corresponding position of the second resource configuration signaling, and determines a repeat indication for validation of the availabilities of the first-type resources of one or more slots of the first node, or of the availabilities of the first-type resources of one or more slots of a cell in a cell set corresponding to the first node, or of the availabilities of the first-type resources of one or more slots of one link of the first node or one link corresponding to a cell in a cell set corresponding to the first node.

In some exemplary implementations, the manner of determining the availabilities of the first-type resources according to the agreed rule includes at least one of the following: the first node determines according to a corresponding relationship between the availabilities of the first-type resources of one or more slots and an index value; in a case where the first node does not receive the resource configuration signaling, the first node determines that the first-type resources are not explicitly indicated as being available; the first node receives indication signaling and repeatedly applies the indication signaling to one or more subsequent slots until a new indication signaling is received; the first node receives indication signaling and validates the indication signaling for a duration, and in a case where a new indication signaling is not received after the expiration of the duration, determines subsequent first-type resources are not explicitly indicated as being available; the first node receives indication signaling without repeatedly applying the indication signaling to one or more subsequent slots, and determines that first-type resources of the one or more subsequent slots are not indicated as being available; the first node determines according to a corresponding relationship between a pattern of the availabilities of the first-type resources of one or more slots and an index value; in a case where the first node receives a second resource configuration signaling, the first node determines to validate the second resource configuration signaling on a slot where the second resource configuration signaling is received; and in a case where the first node receives a second resource configuration signaling, the first node determines to validate the second resource configuration signaling on a slot where the second resource configuration signaling is received and which contains first-type resources, or to validate the second resource configuration signaling on a subsequent slot which is closest to a slot where the second resource configuration signaling is received and which contains first-type resources. The one or more slots are a validation slot or several consecutive slots starting from a validation slot, or a validation slot or a plurality of slots containing first-type resources starting from a validation slot.

In some exemplary implementations, the availabilities of the first-type resources of a slot include an invalidation indication for indicating that the availabilities of the slot are invalid.

In some exemplary implementations, the operation of determining the availabilities of the first-type resources according to the agreed rule includes: the second node determines the availabilities of the first-type resources under an ECP according to an availability pattern under an NCP in one of following manners: in a case where Two OFDM symbols under the NCP overlapping with an OFDM symbol under the ECP are both available, the first node determines that the OFDM symbol under the ECP is available; in a case where one of two OFDM symbols under the NCP overlapping with an OFDM symbol under the ECP is available, the first node determines that the OFDM symbol under the ECP is available; in a case where an OFDM symbol with a longer overlapping region in two OFDM symbols under the NCP overlapping with an OFDM symbol under the ECP is available, the first node determines that the OFDM symbol under the ECP is available; and the first node determines an availability combination of first-type resources corresponding to S1 OFDM symbols of each slot in each availability combination according to one or more availability combinations corresponding to a first resource configuration signaling sent by the second node. Herein, S1 is the number of OFDM symbols contained in one slot under configuration of ECP, and the first node ignores availabilities of OFDM symbols beyond S1 OFDM symbols.

The present disclosure is described above from the perspective of a first node, and will be described below from the perspective of a second node.

In the embodiment of the present disclosure, a resource indication method is provided, which includes the following operation. A second node determines to indicate availabilities of first-type resources to a first node according to an agreed rule and/or by sending resource configuration signaling to the first node.

In some exemplary implementations, the resource configuration signaling in the embodiment of the present disclosure includes: a first resource configuration signaling and a second resource configuration signaling.

It is to be noted that in a case where a second node indicates that a first-type resource is available, the first-type resource is a resource for scheduling at least one child node or terminal of the first node by the first node.

In some exemplary implementations, the first resource configuration signaling includes at least one of the following: an availability combination of the first-type resources of one or more slots; a first index corresponding to the availability combination; an index of a cell in a cell set corresponding to the first node; an availability combination of the first-type resources of one or more slots for one link of the first node or one link of a cell in a cell set corresponding to the first node; a second index corresponding to one link of an availability combination of the first-type resources of one or more slots for one link of the first node or one link of a cell in a cell set corresponding to the first node; and positions of a cell index, a second index, and a first index of the availability combination in the second resource configuration signaling.

In some exemplary implementations, the availability combination of various symbols of the first-type resources includes at least one of the following: one or more intra-slot symbol availability combinations under configuration of an NCP; a third index corresponding to one or more intra-slot symbol availability combinations under configuration of an NCP; one or more intra-slot symbol availability combinations under configuration of an ECP; a fourth index corresponding to one or more intra-slot symbol availability combinations under configuration of an ECP; one or more intra-slot transmission direction-based availability combinations; and a fifth index corresponding to one or more intra-slot transmission direction-based availability combinations.

In some exemplary implementations, the availability combination of the first-type resources in the embodiment of the present disclosure further includes at least one of the following: invalidation indication, repeat indication, duration indication, duration indication, and offset indication.

In some exemplary implementations, the availability combination of the first-type resources of one or more slots is configured according to at least one of the following manners: being configured for the first node; being configured for a cell in a cell set corresponding to the first node; and being configured for one link of the first node or one link corresponding to a cell in a cell set corresponding to the first node.

In some exemplary implementations, the second resource configuration signaling is used for indicating the availabilities of the first-type resources of one or more slots.

In some exemplary implementations, the second resource configuration signaling carries an availability combination index for indicating an availability combination of one or more slots of the first node, or an availability combination of one or more slots of a cell in a cell set corresponding to the first node, or an availability combination of one or more slots of one link of the first node or one link corresponding to a cell in a cell set corresponding to the first node. The method further includes at least one of the following.

The second resource configuration signaling carries an availability offset for indicating an offset for validation of the availabilities of one or more slots of the first node, or of the availabilities of one or more slots of a cell in a cell set corresponding to the first node, or of the availabilities of one or more slots of one link of the first node or one link corresponding to a cell in a cell set corresponding to the first node. Alternatively, the second resource configuration signaling carries an availability duration for indicating a duration for validation of the availabilities of one or more slots of the first node, or of the availabilities of one or more slots of a cell in a cell set corresponding to the first node, or of the availabilities of one or more slots of one link of the first node or one link corresponding to a cell in a cell set corresponding to the first node. Alternatively, the second resource configuration signaling carries an availability repeat indication for indicating repeated validation of the availabilities of one or more slots of the first node, or of the availabilities of one or more slots a cell in a cell set corresponding to the first node, or of the availabilities of one or more slots of one link of the first node or one link corresponding to a cell in a cell set corresponding to the first node.

In some exemplary implementations, the manner of determining the availabilities of the first-type resources according to the agreed rule includes at least one of the following. In a case where the second node does not send the resource configuration signaling to the first node, the second node does not explicitly indicate that the first-type resources are available. The first node receives indication signaling and repeatedly applies the indication signaling to one or more subsequent slots until a new indication signaling is received. The first node receives indication signaling without repeatedly applying the indication signaling to one or more subsequent slots, and determines that first-type resources of the one or more subsequent slots are not indicated as being available. The first node determines according to a corresponding relationship between a pattern of the availabilities of the first-type resources of one or more slots and an index value. The first node receives indication signaling, and determines to validate the indication signaling on a current slot. The first node receives indication signaling, determines to validate the indication signaling on a slot closest to a current slot, and in a case where the current slot contains first-type resources, determines to validate the indication signaling on the current slot.

In some exemplary implementations, the operation of determining the availabilities of the first-type resources according to the agreed rule includes: the second node determines the availabilities of the first-type resources under an ECP according to an availability pattern under an NCP in one of the following manners. In a case where Two OFDM symbols under the NCP overlapping with an OFDM symbol under the ECP are both available, the first node determines that the OFDM symbol under the ECP is available. In a case where one of two OFDM symbols under the NCP overlapping with an OFDM symbol under the ECP is available, the first node determines that the OFDM symbol under the ECP is available. In a case where an OFDM symbol with a longer overlapping region in two OFDM symbols under the NCP overlapping with an OFDM symbol under the ECP is available, the first node determines that the OFDM symbol under the ECP is available. The first node determines an availability combination of first-type resources corresponding to S1 OFDM symbols of each slot in each availability combination according to one or more availability combinations corresponding to a first resource configuration signaling sent by the second node. Herein, S1 is the number of OFDM symbols contained in one slot under configuration of ECP, and the first node ignores availabilities of OFDM symbols beyond S1 OFDM symbols.

Through the description of the above embodiments, those having ordinary skill in the art can clearly understand that the method according to the above embodiment may be implemented according to software plus a necessary general hardware platform, and of course, may also be implemented through hardware, but in many cases, the former is a better embodiment. Based on such understanding, the technical solution of the present disclosure, which is essential or contributes to the conventional art, may be embodied in the form of a software product stored in a storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various examples of the present disclosure.

Embodiment 2

In the present embodiment, a resource determination device is provided. The device is used to implement the above embodiments and exemplary implementations, and those have not been described will not be elaborated. As used below, the term "module" may implement a combination of software and/or hardware of a predetermined function. Although the device described in the following examples is preferably implemented by software, hardware or a combination of software and hardware is also possible and conceived.

The embodiment of the present disclosure provides a resource determination device, which is applied to a first node and includes: a first determination module, configured to determine availabilities of first-type resources of one or more slots according to an agreed rule and/or according to a resource configuration signaling.

The embodiment of the present disclosure provides a resource indication device, which is applied to a second node and includes: a second determination module, configured to determine to indicate availabilities of first-type resources to a first node according to an agreed rule and/or by sending resource configuration signaling to the first node.

It is to be noted that each of the above modules may be implemented by software or hardware. For the latter, it may be implemented by, but not limited to, the following manners that the above modules are all located in the same processor; or, the above modules are located in different processors in any combination form respectively.

The present disclosure is illustrated below in connection with exemplary embodiments of the present disclosure.

Exemplary Embodiment 1

As shown in FIG. 2, attributes of time domain resources of a DU are divided into H (Hard), S (Soft) and NA (Not Available).

A Parent node determines the positions of slots with Soft symbols in DU resources of a child node according to resource configuration of a child DU. As shown in FIG. 2, the slots J, J+1, J+2, K, K+1, and K+2 are slots with Soft symbols, and the slots do not have to be continuous in a time domain.

In order to indicate the availability of different symbols within one slot, some availability patterns within one slot may be agreed in a protocol. As shown in Table 1, each entry in the table defines a pattern of availability within one slot.

TABLE 1

| Available Index (AI) | Available pattern |
|---|---|
| 0 | [1 1 1 1 1 1 1 1 1 1 1 1 1 1] |
| 1 | [0 1 1 1 1 1 1 1 1 1 1 1 1 1] |
| 2 | [0 0 1 1 1 1 1 1 1 1 1 1 1 1] |
| 3 | [0 0 0 1 1 1 1 1 1 1 1 1 1 1] |
| 4 | [0 0 0 0 1 1 1 1 1 1 1 1 1 1] |
| 5 | [0 0 0 0 0 1 1 1 1 1 1 1 1 1] |
| 6 | [0 0 0 0 0 0 1 1 1 1 1 1 1 1] |
| 7 | [1 0 1 0 1 0 1 0 1 0 1 0 1 0] |
| ... | ... |

Table 1 is an illustration of availability patterns of 14 OFDM symbols within one slot, taking normal CP as an example.

Each index entry in Table 1 corresponds to availability situations of various symbols within one slot, where 1 indicates available, and the indication agreement of availability only works for Soft symbols in a case where not all symbols of DU resources of a certain slot are Soft resources. For example, in a case where the first 4 symbols of the 14 symbols of one slot are NA and the last 10 symbols of the 14 symbols are Soft symbols, if an Available Index (AI) indicated for this slot is 2, and a corresponding availability pattern is [0 0 1 1 1 1 1 1 1 1 1 1 1 1], then the indicated availability of the Soft symbols is that the last 10 symbols are Available, rather than that the last 12 symbols are Available.

One or more entries in table 1 constitute an availability indication of Soft resources of one or more slots, which corresponds to one combination situation. By configuring a plurality of combinations to indicate several Soft resource availability combinations of several slots, the parent node configures a plurality of Soft resource availability indications of several slots through high-layer signaling, each combination is identified by a unique combination ID, and different combinations may contain different numbers of slots.

It is agreed that the Soft resource availability indicated by the Parent node is the availability for the first slot with Soft symbols starting from a slot carrying Soft resource availability dynamic signaling.

As shown in FIG. 2, the Soft resource availability dynamic signaling is carried on slot A. However, the slot A does not contain Soft symbols. Starting from slot A (including slot A), the first slot with Soft symbols is slot J, and the parent node sends Soft resource availability dynamic signaling carrying the above unique combination ID to the child node. The combination ID corresponds to an availability pattern of one or more slots. For example, a Soft resource availability combination with a combination ID being combination ID1 is [0 1 2 3], which indicates that, starting from slot A, the Soft resource availability pattern of the first slot (for example, slot J) with Soft symbols is [1 1 1 1 1 1 1 1 1 1 1 1 1 1], which means that all the Soft symbols on the slot J are available.

The arrangement of Hard and Soft resources in FIG. 2 is merely exemplary and does not constitute a limitation on the present disclosure.

The Soft resource availabilities corresponding to the indexes of Table 1 are merely exemplary and do not exclude combinations of other index numbers and different availability patterns, in other words, Table 1 does not constitute a limitation on the present disclosure.

The dynamic signaling refers to physical layer signaling, e.g., transmitted on a physical downlink control channel, a physical broadcast channel or a physical feedback channel.

Exemplary Embodiment 2

As shown in Table 1, by the protocol agreement, a child node knows an availability pattern within one slot corresponding to each AI.

The Child node receives Soft resource availability combinations of one or more slots configured by a parent node through high-layer signaling, where each combination corresponds to a combination ID.

The Child node receives dynamic signaling indicating a Soft resource availability combination on slot k. According to an agreed rule, if slot k contains Soft symbols, the first slot corresponding to the Soft resource availability indication is slot k. The child node receives dynamic signaling indicating Soft resource availability on slot k. If slot k does not contain Soft symbols and a slot with Soft symbols which is closest to slot k is slot k+n, the first slot corresponding to the Soft resource availability indication is slot k+n.

For example, a child IAB receives Soft resource availability indications of 4 slots on slot k, and indexes of availability patterns corresponding to the 4 slots are respectively [0 1 2 3]. The child IAB determines that slot k does not contain Soft symbols according to resource configuration of a DU, and the child IAB determines that the 4 slots, which are closest to slot k, with Soft symbols are respectively slot k+n1, slot k+n2, slot k+n3, and slot k+n4. Then the child IAB determines that all slot symbols of slot k+n1 are available, symbols 1-13 in slot symbols of slot k+n2 are available, and so on, which will not be described in detail.

In the above example, all Soft symbols within slot k+n1 are available. However, if only some symbols of slot k+n1 are Soft resources, the availability indication works only for Soft symbols. For example, if symbols 0-6 of slot k+n1 are Soft symbols, an actual determination result is that symbols 0-6 are available resources, i.e., a child DU can use these resources to perform resource scheduling of the next level node and terminal.

If Soft DL resources of the DU are indicated as being available, the DU can use these resources to perform downlink scheduling of the next level node and terminal. If Soft UL resources of the DU are indicated as being available, the DU can use these resources to perform uplink scheduling of the next level node and terminal.

The Soft resource availabilities corresponding to the indexes of Table 1 are merely exemplary and do not exclude combinations of other index numbers and different availability patterns, in other words, Table 1 does not constitute a limitation of the disclosure.

Exemplary Embodiment 3

As in Exemplary Embodiment 1, some Soft resource availability patterns within one slot as shown in Table 1 are agreed in a protocol, and a parent node configures one or more groups of Soft resource availability combinations of several consecutive slots through high-layer signaling. Each combination corresponds to a combination of availability patterns of one slot or a plurality of consecutive slots, each combination corresponds to a unique combination ID, and the number of slots corresponding to different combinations does not have to be the same.

The combination IDs are unique to the child node, i.e., in a case where the parent node configures Soft resource availability combinations of several consecutive slots for child node 1 through high-layer signaling, these combination IDs are unique to child node 1.

The indication manner of the present embodiment differs from that of Embodiment 1 in that no matter whether a slot includes Soft symbols, the agreed availability indication would contain a Soft resource availability indication of several consecutive slots in the time domain.

As shown in FIG. 3, the parent node sends dynamic signaling indicating Soft resource availability of several consecutive slots in the time domain to the child node on slot A. The dynamic signaling at least contains a combination ID indicating an availability combination of several consecutive slots.

It is agreed that Soft resource availability is valid on slot A. In the embodiment, if no Soft symbols are included in slot A, then the indication of Soft availability is invalid, regardless of which pattern the Soft availability corresponding to slot A is.

Alternatively, the Soft resource availability is valid in a slot with Soft symbols which is closest to slot A, for example, in slot J of FIG. 3.

Exemplary Embodiment 4

As shown in Table 1, by the protocol agreement, a child node knows an availability pattern within one slot corresponding to each AI.

The Child node receives Soft resource availability combinations of one or more slots configured by a parent node through high-layer signaling. Each combination corresponds to a combination ID.

The Child node receives dynamic signaling indicating a Soft resource availability combination on slot k. If slot k contains Soft symbols, the first slot corresponding to the Soft resource availability indication is slot k. The child node receives dynamic signaling indicating Soft resource availability on slot k. If slot k does not contain Soft symbols and a slot with Soft symbols which is closest to slot k is slot k+n, then the first slot corresponding to the Soft resource availability indication is slot k+n.

Alternatively, the child node receives dynamic signaling indicating Soft resource availability on slot k, then the first slot corresponding to the Soft resource availability indication is slot k.

The Child node identifies Soft resource availability patterns of several slots according to a combination ID indicated by the received dynamic signaling, and the child node determines, according to the combination ID, Soft resource availability of several consecutive slots starting from the first slot on which the Soft resource availability indication is valid.

In a case where there are no Soft symbols in a certain slot or Soft symbols in a certain slot are inconsistent with the Soft resource availability pattern in the slot, the Soft resource availability pattern works only for Soft symbols in the slot. Alternatively, in a case where there are no Soft symbols in a certain slot or Soft symbols in a certain slot are inconsistent with the Soft resource availability pattern in the slot, for example, the Soft resource availability pattern indicates that all symbols (symbols 0-13) of one slot are available, while the DU resource configuration of this slot only has symbols 2-13 as Soft symbols, the Soft resource availability pattern of this slot is considered invalid, and it is determined that none of Soft symbols of this slot is indicated as being available.

Exemplary Embodiment 5

Some Soft resource availability patterns within slots as shown in Table 2 are agreed in a protocol. The indication of the present embodiment differs from Exemplary Embodiment 3 in that Table 2 introduces an index indicating that an intra-slot Soft resource availability pattern is not defined, this index being referred to as a Soft resource undefined index, corresponding to index 255 in Table 2.

TABLE 2

| Available Index (AI) | Available pattern |
|---|---|
| 0 | [1 1 1 1 1 1 1 1 1 1 1 1 1 1] |
| 1 | [0 1 1 1 1 1 1 1 1 1 1 1 1 1] |
| 2 | [0 0 1 1 1 1 1 1 1 1 1 1 1 1] |
| 3 | [0 0 0 1 1 1 1 1 1 1 1 1 1 1] |
| 4 | [0 0 0 0 1 1 1 1 1 1 1 1 1 1] |
| 5 | [0 0 0 0 0 1 1 1 1 1 1 1 1 1] |
| 6 | [0 0 0 0 0 0 1 1 1 1 1 1 1 1] |
| 7 | [1 0 1 0 1 0 1 0 1 0 1 0 1 0] |
| ... | ... |
| 255 | — |

Table 3 agrees on an availability pattern of 14 symbols in a slot under configuration of an NCP. In the table, 1 indicates that the corresponding Soft symbol is available, and 0 indicates that the corresponding Soft symbol is not available.

A Parent node configures one or more groups of Soft resource availability combinations of several consecutive slots through high-layer signaling. Each combination corresponds to a combination of availability patterns of one slot or a plurality of consecutive slots, each combination corresponds to a unique combination ID, and the number of slots corresponding to different combinations does not have to be the same. In a case where an AI corresponding to a certain slot is the Soft resource undefined index, it means that the parent node does not indicate the Soft resource of this slot.

The combination IDs are unique to the child node, i.e., in a case where the parent node configures Soft resource availability combinations of several consecutive slots for child node 1 through high-layer signaling, these combination IDs are unique to child node 1. Child node 1 is notified of the availability pattern of several consecutive slots by the combination ID. If the parent node does not indicate the availability of any Soft symbols for one of the slots, the AI corresponding to this slot is set as the Soft resource undefined index in a combination pattern.

Exemplary Embodiment 6

Some Soft resource availability patterns within slots as shown in Table 2 are agreed in a protocol. The indication of the present embodiment differs from Exemplary Embodiment 4 in that Table 2 introduces an index indicating that an intra-slot Soft resource availability pattern is not defined, this index being referred to as a Soft resource undefined index, corresponding to index 255 in Table 2.

The Child node receives Soft resource availability combinations of one or more slots configured by a parent node through high-layer signaling. Each combination corresponds to a combination ID.

The Child node receives dynamic signaling indicating a Soft resource availability combination on slot k. If slot k contains Soft symbols, the first slot corresponding to the Soft resource availability indication is slot k. The child node receives dynamic signaling indicating Soft resource availability on slot k. If slot k does not contain Soft symbols and a slot with Soft symbols which is closest to slot k is slot k+n, then the first slot corresponding to the Soft resource availability indication is slot k+n.

Alternatively, the child node receives dynamic signaling indicating Soft resource availability on slot k, then the first slot corresponding to the Soft resource availability combination is slot k.

The Child node identifies Soft resource availability patterns of several slots according to a combination ID indicated by the received dynamic signaling, and the child node determines, according to the combination ID, Soft resource availability of several consecutive slots starting from the first slot on which the Soft resource availability indication is valid.

In a case where there are no Soft symbols in a certain slot or Soft symbols in a certain slot are inconsistent with the Soft resource availability pattern in the slot, the Soft resource availability pattern works only for Soft symbols in the slot. Alternatively, in a case where there are no Soft symbols in a certain slot or Soft symbols in a certain slot are inconsistent with the Soft resource availability pattern in the slot, for example, the Soft resource availability pattern indicates that all symbols (symbols 0-13) of one slot are available, while the DU resource configuration of this slot only has symbols 2-13 as Soft symbols, the Soft resource availability pattern of this slot is considered invalid, and it is determined that none of Soft symbols of this slot is indicated as being available.

In a case where the child node identifies, according to the combination ID indicated by the received dynamic signaling, that the resource availability of several slots indicates that the Soft resource availability pattern corresponding to a certain slot is a Soft resource undefined index, the child node considers that Soft resources of this slot are not indicated as being available.

Exemplary Embodiment 7

Based on one of Exemplary Embodiments 1 to 7, a parent node and a child node may further agree that the resource availability of several slots indicated by the parent node through dynamic signaling is applied repeatedly. For example, the parent node agrees two availability combination patterns through high-layer signaling.

Combination 1 corresponds to 5 consecutive slots, and intra-slot Soft resource AIs of these consecutive or non-consecutive slots are respectively indexes [1, 2, 3, 4, 5] in Table 2, corresponding to a combination ID of 1.

Combination 2 corresponds to 2 consecutive slots, and intra-slot Soft resource AIs of these consecutive or non-consecutive slots are respectively indexes [2, 4] in Table 2, corresponding to a combination ID of 2.

If the slots corresponding to the combination ID are several consecutive slots, the Parent node indicates, on slot k through dynamic signaling, for the child node that the combination ID of Soft resource availability is 1, representing that Soft resource AIs of 5 consecutive slots starting from slot k are [0, 1, 2, 3, 4]. According to an agreed relationship in Table 1, an availability pattern corresponding to the Soft resource AI 1 of slot k is [1 1 1 1 1 1 1 1 1 1 1 1 1 1], i.e., all Soft resources of slot k are available resources. An availability pattern corresponding to the Soft resource AI 2 of slot k+1 is [0 1 1 1 1 1 1 1 1 1 1 1 1 1], i.e., Soft resources of symbols 1 to 13 of slot k+1 are available resources, where the number of symbol starts from 0.

If the parent node does not send a new dynamic signaling indication on slot k+6, the combined ID sent on slot k will be applied repeatedly as agreed. That is, the Soft resource AIs of slot k+6 and slot k are the same, the Soft resource AIs of slot k+7 and slot k+1 are the same, and so on. When the parent node is ready to update the DU configuration of the child node, the parent node may send a new dynamic signaling to indicate a new combination ID. For example, dynamic signaling containing a combination ID of 2 is sent on slot k+6. Then the parent node notifies the child node that the intra-slot Soft resource AIs of two consecutive slots indicated by the combination ID of 2 on slot k+6 are 2 and 4 respectively. That is, the Soft resource availability pattern of slot k+6 is [0 0 1 1 1 1 1 1 1 1 1 1 1 1], and the Soft resource availability pattern of slot k+7 is [0 0 0 0 1 1 1 1 1 1 1 1 1 1].

The solution is also applicable in cases where the slots corresponding to the combination ID are non-consecutive slots. For example, the configuration of DU resources of the child node for each slot within a period is [H S H S H S H S], where H represents hard, and S represents Soft. In a case where a combination ID sent by the parent node through a dynamic signaling indication on slot k is 2, then it is indicated that the intra-slot Soft resource AIs of slot k+1 and slot k+3 are 2 and 4, respectively, because the two slots, slot k and slot k+2, do not contain Soft symbols. In a case where the parent node wants to apply the previous Soft resource availability combination for subsequent slots, the parent node subsequently does not send a new dynamic signaling. Thus, the intra-slot Soft resource AIs of slots k+7 and slot k+9 are 2 and 4, respectively.

It is further possible to introduce a field for indicating whether the combination ID is applied repeatedly, for example as shown in Table 3.

TABLE 3

| Available Index (AI) | Available pattern |
| --- | --- |
| 0 | [1 1 1 1 1 1 1 1 1 1 1 1 1 1] |
| 1 | [0 1 1 1 1 1 1 1 1 1 1 1 1 1] |
| 2 | [0 0 1 1 1 1 1 1 1 1 1 1 1 1] |
| 3 | [0 0 0 1 1 1 1 1 1 1 1 1 1 1] |
| 4 | [0 0 0 0 1 1 1 1 1 1 1 1 1 1] |
| 5 | [0 0 0 0 0 1 1 1 1 1 1 1 1 1] |
| 6 | [0 0 0 0 0 0 1 1 1 1 1 1 1 1] |
| ... | ... |
| 255 | Repeat |

The Parent node and the child node agree that the intra-slot Soft resource AI being 255 represents that the child node is notified that the combination ID of this dynamic signaling will be applied repeatedly until a new dynamic signaling is sent.

With regard to the child node, according to one of Embodiments 1 to 7, the child node receives an intra-slot Soft resource availability combination of several consecutive or non-consecutive slots corresponding to different combination IDs configured by the parent node through high-layer signaling.

In a case where the child node receives a combination ID sent by the parent node on slot k for indicating the Soft resource availability of several slots, for example, the combination ID of 1 corresponds to intra-slot Soft resource AIs of 5 consecutive slots [1, 2, 3, 4, 5, 255], respectively, then the child node interprets that the Soft resource availability pattern of slot k is [0 1 1 1 1 1 1 1 1 1 1 1 1 1], ..., the Soft resource availability pattern of slot k+4 is [0 0 0 0 1 1 1 1 1 1 1 1 1 1]. The last index 255 indicates that this dynamic signaling indication will be applied periodically unless a new dynamic signaling containing a combination ID is received. For example, in a case where the child node does not receive a combination ID indicating the Soft resource availability of several slots on slot k+5, the child node will repeatedly apply the previously received combination ID to subsequent slots, for example, the Soft resource availability pattern of slot k+6 is [0 1 1 1 1 1 1 1 1 1 1 1 1 1], and so on. In a case where the child node receives a new combination ID, intra-slot Soft resource availability of current and subsequent slots is determined according to the new combination ID.

This scheme is also applicable to Soft resource availability indication for non-consecutive slots. For example, the configuration of DU resources of the child node for each slot within a period is [H S H S H S H S], where H represents hard, and S represents Soft. In a case where the child node receives a combination ID of 2 indicated by dynamic signaling on slot k, the child node interprets that the intra-slot Soft resource AIs of slot k+1 and slot k+3 are 2 and 4 respectively. In a case where the child node does not receive a new combination ID, the child node determines that the Soft symbols of slot k+5 and slot k+7 are available, and so on.

In order to prevent the child node from missing dynamic signaling resulting in inconsistent interpretation of Soft resources for a certain slot, the occurrence opportunity for dynamic signaling indicating the combination ID to occur again after the occurrence of a repeated application field may be agreed. For example, a new dynamic indication is not expected to be received within a duration of T1 starting from receiving of dynamic signaling indicating a combination ID. T1 may be a time agreed in a protocol or a parameter configured by a high layer, and the child node learns the time configured by the parent node by receiving high-layer signaling.

The use of an index 255 for indicating the repeated application of the combination ID indicated by this dynamic signaling is merely exemplary, the table agreed practically may also use different values, and the specific values do not limit the present disclosure.

The period for the DU resource H/S/NA in the example of the present exemplary embodiment and the duration corresponding to several slots indicated by the combination ID indicated by dynamic signaling may be different, and may be the same in practice.

Exemplary Embodiment 8

Intra-slot Soft resource availability patterns are agreed, as shown in Table 4, and each intra-slot Soft resource availability pattern corresponds to an availability pattern within a slot for Soft symbols indicated according to their respective direction.

TABLE 4

| Available Index (AI) | Meaning |
| --- | --- |
| [0 0 0] 0 | Intra-slot downlink/flexible/uplink soft symbols are not available |
| [0 0 1] 1 | Intra-slot uplink soft symbols are available, and downlink/flexible soft symbols are not available |
| [0 1 0] 2 | Intra-slot flexible soft symbols are available, and downlink/uplink soft symbols are not available |
| [0 1 1] 3 | Intra-slot flexible/uplink soft symbols are available, and downlink soft symbols are not available |
| [1 0 0] 4 | Intra-slot downlink soft symbols are available, and flexible/uplink soft symbols are not available |
| [1 0 1] 5 | Intra-slot downlink/uplink soft symbols are available, and flexible soft symbols are not available |
| [1 1 0] 6 | Intra-slot downlink/flexible soft symbols are available, and uplink soft symbols are not available |
| [1 1 1] 7 | Intra-slot downlink/flexible/downlink soft symbols are available |

For example, an index of 0 indicates that uplink, downlink, and flexible symbols within a slot are not available, and an index of 1 indicates that uplink Soft symbols within one slot are available, and downlink and flexible Soft symbols within one slot are not available.

The Soft symbol availability combinations of several slots are configured through high-layer signaling, and each combination is unique to one child node.

The Parent node indicates this combination ID through dynamic signaling, and an index value indicates the availability of a series of slots with Soft symbols.

The high-layer signaling defines a series of Soft resource availability combinations of several slots with Soft symbols, and the number of slots contained in each combination is not required to be equal. For example, namely, the number of slots included in the first combination is N1=4, the intra-slot direction-based Soft symbol availabilities corresponding to the 4 slots are respectively [1 2 3 4], and the corresponding combination ID is 1; the number of slots included in the second combination is N2=4, the intra-slot direction-based Soft symbol availabilities corresponding to the 4 slots are respectively [2 4 2 4], and the corresponding combination ID is 2.

The Parent node sends a DCI indicating the Soft resource availability on slot n, the combination ID value indicated by the DCI is 1, and it is determined that the transmission direction-based soft resources availability pattern of 4 slots with Soft symbols is [1 2 3 4].

There is no constraint relationship between the values of N1 and N2. In the present embodiment, the numbers of slots corresponding to two combination IDs are the same, but in practical applications, the numbers of slots corresponding to the two combination IDs are not limited to be equal. The present embodiment does not limit the numbers of slots corresponding to different combination IDs to be equal.

Exemplary Embodiment 9

A Child node receives DU resource configuration from a Center Unit (CU), and the attributes of DU resources of the Child node from slot n to slot n+4 are as shown in Table 5:

TABLE 5

| Slot number | DU resource attribute configuration |
|---|---|
| n | [HD SD SD HF SF SF SF SU SU SU HU HU NA NA] |
| n + 1 | [HD HD HD HF SF SF SF SU SU SU HU HU NA NA] |
| n + 2 | [HD HD HD HF HF HF HF HU HU HU HU HU NA NA] |
| n + 3 | [HD HD HD SF SF SF SF HU HU HU HU HU NA NA] |
| n + 4 | [NA NA HU HU HD SD SD HF SF SF SF SU SU SU] |

HD represents Hard DL, SD represents Soft DL, HF represents Hard Flexible, SF represents Soft Flexible, HU represents Hard UL, SU represents Soft UL, and NA represents Not Available.

The Soft resource availability indication received by the Child node works only for resources with Soft attributes, such as Soft DL, soft Flexible and Soft UL.

Intra-slot Soft resource availability patterns are agreed, as shown in Table 4, and each intra-slot Soft resource availability pattern corresponds to an availability pattern within a slot for Soft symbols indicated according to their respective direction.

For example, an index of 0 indicates that uplink, downlink, and flexible symbols within a slot are not available, and an index of 1 indicates that uplink Soft symbols within one slot are available and downlink and flexible symbols within one slot are not available, and so on.

The Child node receives the high-level signaling configuration and learns the Soft symbol availability combinations of several slots, and each availability combination corresponds to an ID, as shown in FIG. 4.

For example, the number of slots included in the first combination is N1=4, the intra-slot direction-based Soft symbol availabilities corresponding to the 4 slots are respectively [1 2 3 4], and the corresponding combination ID is 1; the number of slots included in the second combination is N2=4, the intra-slot direction-based Soft symbol availabilities corresponding to the 4 slots are respectively [2 4 2 4], and the corresponding combination ID is 2.

The Child node receives dynamic signaling sent by the Parent node on slot n to acquire a value 1 of the combination ID, and determines that the transmission direction-based soft resource availability patterns of 4 consecutive slots are [1 2 3 4].

The interpretation for the Soft resource availability by the Child node is as follows.

Soft UL symbols of slot n are available.
Soft Flexible symbols of slot n+1 are available.
All Soft symbols of slot n+2 are not available because slot n+2 does not have Soft-type resources.
Soft DL symbols of slot n+3 are available and the remaining Soft symbols of slot n+3 are not available.

The Child node receives dynamic signaling sent by the Parent node on slot n to acquire a value 1 of the combination ID, and determines that the transmission direction-based soft resource availability patterns of 4 slots with Soft symbols are [1 2 3 4].

Another interpretation for the Soft resource availability by the Child node is as follows.

Soft UL symbols of slot n are available and the remaining Soft symbols of slot n are not available.
Soft Flexible symbols of slot n+1 are available and the remaining Soft symbols of slot n+1 are not available.
All Soft UL symbols and Soft Flexible symbols of slot n+3 are available and the remaining Soft symbols of slot n+3 are not available.
Soft DL symbols of slot n+4 are available and the remaining Soft symbols of slot n+4 are not available.

Exemplary Embodiment 10

FIG. 5 shows a corresponding relationship between OFDM symbols of NCP and OFDM symbols of ECP. As shown in FIG. 5, one OFDM symbol of ECP and two ODDM symbols of NCP may overlap. The intra-slot Soft symbol availability agreed in one of Tables 1 to 3 is the symbol corresponding to the slot for the NCP. In order to support the intra-slot Soft symbol availability indication of the ECP, intra-slot Soft symbol availability needs to be newly defined for the ECP, for example as shown in Table 6:

TABLE 6

| Available Index (AI) | Available pattern |
|---|---|
| 0 | [1 1 1 1 1 1 1 1 1 1 1 1] |
| 1 | [0 1 1 1 1 1 1 1 1 1 1 1] |
| 2 | [0 0 1 1 1 1 1 1 1 1 1 1] |
| 3 | [0 0 0 1 1 1 1 1 1 1 1 1] |
| 4 | [0 0 0 0 1 1 1 1 1 1 1 1] |
| 5 | [0 0 0 0 0 1 1 1 1 1 1 1] |
| 6 | [0 0 0 0 0 0 1 1 1 1 1 1] |
| ... | ... |

When in the slot configuration of the ECP, the parent node and the child node interpret each AI and the intra-slot Soft symbol availability according to the intra-slot Soft symbol availability pattern of the corresponding ECP configuration.

The parent node configures one or more combination IDs through high-layer signaling configuration, and each combination ID corresponds to a Soft symbol availability pattern of several slots.

The configuration of DU resources from slot n to slot n+4 of the Child node is shown in Table 7:

TABLE 7

| Slot number | DU resource attribute configuration |
|---|---|
| n | [HD SD SD HF SF SF SF SU SU SU HU NA] |
| n + 1 | [SD SD SD HF SF SF SF SU SU SU HU NA] |
| n + 2 | [HD HD HD HF HF HF HF HU HU HU HU NA] |
| n + 3 | [HD HD HD SF SF SF SF HU HU HU HU NA] |
| n + 4 | [NA NA HU HU HD SD SD HF SF SF SF SU] |

For example, in a case where the child node works under configuration of the ECP, the child node receives a combination ID of 1 sent by the parent node on slot n for indicating the Soft resource availability of several slots, which corresponds to intra-slot Soft resource AIs of 5 consecutive slots [0, 1, 2, 3, 4], respectively, then the child node interprets that the Soft resource availability pattern of slot n is [0 1 1 1 1 1 1 1 1 1 1 1 1 1], . . . , the Soft resource availability pattern of slot k+4 is [0 0 0 0 1 1 1 1 1 1 1 1].

Alternatively, the Soft symbol availability indication under configuration of the ECP shares the same intra-slot Soft symbol availability pattern with the NCP, and the availability of ECP symbols is determined based on one of the following criteria. The intra-slot availability pattern agreed in Table 8 is used here.

TABLE 8

| Available Index (AI) | Available pattern |
|---|---|
| 0 | [1 1 1 1 1 1 1 1 1 1 1 1 1 1] |
| 1 | [0 1 1 1 1 1 1 1 1 1 1 1 1 1] |
| 2 | [0 0 1 1 1 1 1 1 1 1 1 1 1 1] |
| 3 | [0 0 0 1 1 1 1 1 1 1 1 1 1 1] |
| 4 | [0 0 0 0 1 1 1 1 1 1 1 1 1 1] |
| 5 | [0 0 0 0 0 1 1 1 1 1 1 1 1 1] |
| 6 | [0 0 0 0 0 0 1 1 1 1 1 1 1 1] |
| . . . | . . . |

In a case where two NCP symbols overlapping with an OFDM symbol under the ECP are available Soft symbols, the Soft symbol corresponding to the ECP is available. In a case where two NCP symbols overlapping with an OFDM symbol under the ECP are not all available Soft symbols, the Soft symbol corresponding to the ECP cannot be considered to be explicitly indicated as being available.

In a case where an NCP symbol, with a longer overlapping region with the ECP, in two NCP symbols overlapping with an OFDM symbol under the ECP is indicated to be available, the Soft symbol corresponding to the ECP is available.

The Soft symbol availability pattern of the ECP only refers to the availability situation of the first nSymbSlotECP symbols in the Soft symbol availability pattern of the NCP, where nSymbSlotECP is the number of symbols in one slot under the configuration.

In a case where one of two NCP symbols overlapping with an OFDM symbol under the ECP is indicated to be available, the Soft symbol corresponding to the ECP is available.

For criterion 1), all Soft symbols of slot n are available because NCP Soft symbols overlapping with an OFDM symbol under the ECP are available, the first symbol of slot n+1 (numbered 0) is not indicated as being available because the first NCP symbol overlapping therewith is not indicated as being available, the remaining Soft symbols are indicated as being available. The Soft symbol availability of other slots is similar.

For criterion 2), all Soft symbols of slot n are available because NCP Soft symbols overlapping with an OFDM symbol under the ECP are available, the first symbol of slot n+1 (numbered 0) is not indicated as being available because an NCP symbol with a longer overlapping region (numbered 0) is not indicated as being available, the remaining Soft symbols are indicated as being available. The Soft symbol availability of other slots is similar.

For criterion 3), all Soft symbols of slot n are available because the first nSymbSlotECP NCP Soft symbols are available, the first symbol of slot n+1 (numbered 0) is not indicated as being available because the first NCP symbol of the first nSymbSlotECP (numbered 0) is not indicated as being available, the remaining Soft symbols are indicated as being available. The Soft symbol availability of other slots is similar.

For criterion 4), all Soft symbols of slot n are available because the first nSymbSlotECP NCP Soft symbols are available, the first symbol of slot n+1 (numbered 0) is available because an NCP symbol (numbered 0) overlapping therewith is available, the remaining Soft symbols are indicated as being available. The Soft symbol availability of other slots is similar.

Exemplary Embodiment 10

This embodiment is similar to Exemplary Embodiment 2 or Exemplary Embodiment 4, except that in a case where the Child node does not receive dynamic signaling containing a combination ID from the parent node, the child node considers that all Soft symbols are not indicated as being available.

Alternatively, in a case where the child node receives dynamic signaling indicating a combination ID on slot n, a slot scope indicated by the dynamic signaling is slot A to slot A+scope_IA, but no dynamic signaling is received after slot A+scope_IA, and then the child node determines that Soft symbols of a subsequent slot are not indicated as being available, where scope_IA is a slot span in which the combination ID in the dynamic signaling indicates the availability.

Alternatively, based on one of Embodiments 1 to 7, a parent node and a child node may further agree that the resource availability of several slots indicated by the parent node through dynamic signaling is applied repeatedly. For example, the parent node agrees two availability combination patterns through high-layer signaling.

Combination 1 corresponds to 5 consecutive slots, and intra-slot Soft resource AIs of these consecutive or non-consecutive slots are respectively [1, 2, 3, 4, 5] in the table, corresponding to a combination ID of 1.

Combination 2 corresponds to 2 consecutive slots, and intra-slot Soft resource AIs of these consecutive or non-consecutive slots are respectively [2, 4], corresponding to a combination ID of 2.

If the slots corresponding to the combination ID are several consecutive slots, the Parent node indicates, on slot k through dynamic signaling, for the child node that the combination ID of Soft resource availability is 1, representing that Soft resource AIs of 5 consecutive slots starting from slot k are [0, 1, 2, 3, 4]. According to an agreed relationship in Table 1, an availability pattern corresponding to the Soft resource AI 1 of slot k is [1 1 1 1 1 1 1 1 1 1 1 1 1 1], i.e., all Soft resources of slot k are available resources. An availability pattern corresponding to the Soft resource AI 2 of slot k+1 is [0 1 1 1 11 1 1 1 1 1 1 1 1], i.e., Soft resources of symbols 1 to 13 of slot k+1 are available resources, where the number of symbol starts from 0.

If the parent node does not send a new dynamic signaling indication on slot k+6, the combined ID sent on slot k will be applied repeatedly. That is, the Soft resource AIs of slot k+6 and slot k are the same, the Soft resource AIs of slot k+7 and slot k+1 are the same, and so on. In a case where the parent node is ready to update the DU configuration of the child node, the parent node may send a new dynamic signaling to indicate a new combination ID, for example, dynamic signaling containing a combination ID of 2 is sent on slot k+6, then the parent node notifies the child node that the intra-slot Soft resource AIs of two consecutive slots indicated by the combination ID of 2 on slot k+6 are 2 and 4 respectively. That is, the Soft resource availability pattern of slot k+6 is [0 0 1 1 1 1 1 1 1 1 1 1 1 1], and the Soft resource availability pattern of slot k+7 is [0 0 0 0 1 1 1 1 1 1 1 1 1 1].

Exemplary Embodiment 11

DU resources configured for a first node by a CU contains a reference sub-carrier interval, then the first node identifies a boundary of a slot of a first-type resource and an OFDM symbol according to a sub-carrier interval of the DU resources configured for the first node.

In a case where the CU configures the DU resources to the first node without indicating the reference sub-carrier interval, the first node identifies a boundary of a slot of a first-type resource and an OFDM symbol according to the sub-carrier interval configuration of an MT of the first node; or identifies a boundary of a slot of a first-type resource and an OFDM symbol according to a reference sub-carrier interval of the uplink and downlink configuration of an MT of the first node. In a case where the first and second nodes have a plurality of parent nodes, the availabilities of the first-type resources indicated by dynamic signaling sent by each parent node are interpreted based on a slot of a first-type resource and an OFDM symbol identified according to a sub-carrier interval configured by the respective parent nodes, respectively. Alternatively, the reference sub-carrier interval is included in the availability configuration of the first-type resource.

Exemplary Embodiment 12

A CU configures DU resources for a first node through signaling, and resource attributes are divided into Hard, Soft and NA, where resources of Hard and Soft attributes may further be divided into Hard UL, Hard Flexible, Hard DL, Soft UL, Soft Flexible, and Soft DL according to a direction. The DU resource types configured by the CU to the second node include a total of 7 resource types: Hard UL, Hard Flexible, Hard DL, Soft UL, Soft Flexible, Soft DL, and NA, where the resource of the Soft attribute corresponds to the first-type resource in the present embodiment.

The availabilities of the first-type resources need to be signaled by the parent node, i.e., the second node shown in FIG. 6.

In a case where the resources of the Soft attribute are further indicated as being available, the first node can use these resources for transmission scheduling of child nodes and terminals of the first node.

Further, the transmission scheduling of child nodes and terminals of a first node is performed by a DU of the first node, one DU may correspond to one or more cells, for example, as shown in FIG. 6, one DU corresponds to three cells and each cell serves a terminal or a child node. A cell with Cell ID_1 serves a child node and a terminal, a cell with cell ID_2 serves a terminal, and a cell with Cell ID_3 serves a child node and a terminal.

One way of indicating the availabilities of the first-type resources is that the first node uniformly indicates the availabilities of the first-type resources for the second node. Either Cell ID_1 or Cell ID_2 has the same interpretation of availability.

A signaling format thereof is as follows:

```
SoftIndicator ::=    SEQUENCE {
    sai-RNTI                 RNTI-Value,
    dci-PayloadSize          INTEGER (1..maxSAI-DCI-PayloadSize),
    SoftAvailabilityCombinations SEQUENCE (SIZE
(1..maxNrofSoftAvailabilityCombinationsPerSet)) OF SoftAvailabilityCombination
    positionInDCI            INTEGER(0..maxSAI-DCI-PayloadSize-1)
    ...
}
SoftAvailabilityCombination ::=          SEQUENCE {
    softAvailabilityCombinationId            SoftAvailabilityCombinationId,
    softAvailability                         SEQUENCE (SIZE
(1..maxNrofSoftAvailabilityPerCombination)) OF INTEGER (0..255)
}
SlotFormatCombinationId ::=      INTEGER
(0..maxNrofSoftAvailabilityCombinationsPerSet-1)
``` where
    sai-RNTI: an RNTI for identifying control signaling bearing an availability indication of a first-type resource;
    dci-PayloadSize: a control signaling payload bearing an availability indication of a first-type resource;
    SoftAvailabilityCombinations: one or more first-type resource availability combinations, each combination being first-type resource availability of one or more slots;
    SoftAvailabilityCombination: a first-type resource availability combination;
    softAvailabilityCombinationId: a first-type resource availability combination index;
    softAvailability: first-type resource availability of one or more slots.

Further, a plurality of cells corresponding to the first node may also be carried in configuration parameters, i.e., the above-mentioned SoftIndicator further include a field cellId so that cell-specific first-type resource availability of several slots can be configured for each cell corresponding to the first node. Alternatively, first-type resource availability of several slots of a cell corresponding to the first node may be additionally configured on the basis of the first-type resource availability of several slots configured by the second node.

The cellId in the signaling may be an optional field. In a case where cellID is missing, the signaling is used for the availability indication of the first-type resource of the first node or the availability indication of the first-type resource of the DU of the first node.

In a case where the first node is configured with the availability indication of the corresponding cell and the availability indication of the corresponding first node, i.e., the DU, the first-type resource availability of the corresponding cell is determined according to cell-specific first-type resource availability.

Still further, the availabilities of the first-type resources are configured for a specific link of a specific cell of the first node.

Table 9 shows a method for determining the availabilities of the first-type resources:

TABLE 9

| Number | Configuration | Node or DU resource availability | Cell resource availability | Specific link resource availability |
| --- | --- | --- | --- | --- |
| 1 | A | A | A | A |
| 2 | B | —/B | B | B |
| 3 | C | —/C | —/C | C |
| 4 | A + B | A | B | A: If B does not contain a specific link<br>B: If B contains a specific link |
| 5 | A + C | A | A | C |
| 6 | B + C | —/B | B | C |
| 7 | A + B + C | A | B | C |

A in the "Configuration" column of Table 9 indicates that the first node is configured with a first-type resource availability combination of a node or a DU. B represents that the first node is configured with a cell-specific first-type resource availability combination. C represents that the first node is configured with a first-type resource availability combination of a specific link. A+B represents that the first node is configured with first-type resource availability of a node or a DU and is also configured with a cell-specific first-type resource availability combination, and the other cases are similar.

A in the "Node or DU resource availability" column in Table 8 represents that a node or DU-specific first-type resource availability combination of the first node is determined according to the node or DU-specific first-type resource availability combination. -/B represents that the first-type resource availability combination of the first node is not configured or determined according to the cell-specific first-type resource availability combination. -/C represents that the first-type resource availability combination of the first node is not configured or determined according to the first-type resource availability combination of a specific link, and so on. For example, in a combination configuration numbered 2, the first node is not configured with a first-type resource availability combination for a node, the first node is configured with a first-type resource availability combination for a cell associated with the first node, and then the resource availability of the first node is determined by agreement according to the first-type resource availability combination for the cell, or it is determined by agreement that there is no first-type resource availability combination for the first node. As shown in FIG. 6, a cell with cell ID_1 of the first node is configured with the first-type resource availability combination. However, the first node is not configured with the first-type resource availability combination, and then the first-type resource availability combination of the first node is determined according to the first-type resource availability combination corresponding to the cell with cell ID_1. In a case where the first node is not configured with the first-type resource availability combination, but two cells corresponding to cell ID_1 and cell ID_2 are respectively configured with the first-type resource availability combination, and a cell with cell ID_3 is not configured with the first-type resource availability combination. Then the first-type resource availability combination corresponding to a cell with a small ID is applied to the first-type resource availability combination of the first node, or the first-type resource availability of a cell configured with the first-type resource availability, which has the same configuration as the cell not configured with the first-type resource availability combination, is applied to this cell. The two cells, such as cell ID_1 and cell ID_1 in FIG. 6, are configured with the first-type resource availability combination, the cell with cell ID_3 is not configured with the first-type resource availability combination, and the cells with cell ID_3 and cell ID_2 have the same frame parameter configuration. For example, the two cells have the same sub-carrier interval, the same CP configuration, the same duplex mode or the same or similar frame structure configuration, the same or close center frequency point, and the same or close bandwidth. The first node then applies the first-type resource availability combination of cell ID_2 to the first-type resource availability combination of cell ID_3.

A in the "Cell resource availability" column in Table 9 represents that a first-type resource availability combination of a cell corresponding to the first node is determined according to a first-type resource availability combination of a node or a DU. -/C represents that the first-type resource availability combination of the cell corresponding to the first node is not configured or determined according to the first-type resource availability combination of a specific link. For example, in the combination configuration numbered 3, if a specific cell of the first node is not configured with the first-type resource availability combination, the first-type resource availability combination of this cell is determined according to the first-type resource availability combination of the first node.

A in the "Specific link resource availability" column in Table 9 represents that a first-type resource availability combination of a specific link of the first node is determined according to a first-type resource availability combination of a node or a DU. For example, in a combination configuration numbered 1, the first node is not configured with a first-type resource availability combination of a specific link, and the specific link may be a terminal or child node connected by the first node. As shown in FIG. 6, a link corresponding to terminal 1 connected to the first node is numbered L2. If link L2 of the first node is not configured with the first-type resource availability combination and the first node is not configured with the first-type resource availability combination of a corresponding cell, the first-type resource availability combination of link L2 is determined according to the first-type resource availability combination of the first node.

The first node receives control information containing an availability combination ID, descrambles the control information according to an RNTI indicated in SoftIndicator, and extracts first-type resource availability of a corresponding node or a corresponding DU or a corresponding cell or a corresponding link from a corresponding position of the control information according to positionInDCI indicated in SoftIndicator. In a case where the first node simultaneously receives a first-type resource availability indication of a corresponding node and a first-type resource availability indication of a corresponding cell, the first node determines the availabilities of the first-type resources according to the first-type resource availability of the corresponding cell. In a case where the first node simultaneously receives a first-type resource availability indication of a corresponding node and a first-type resource availability indication of a corresponding cell, and receives a first-type resource availability indication of a certain link connected to the cell, the first-type resource availability for this link is determined according to the first-type resource availability indication of this link. That is, in a case where first-type resource availability indications of two or more granularities are configured simultaneously, the first-type resource availability is determined with a smaller granularity.

Exemplary Embodiment 13

According to the method described in Exemplary Embodiments 1, 3, 5, 7, and 8, the parent node indicates the first-type resource or Soft resource availability to the child node, and may further indicate an offset for validation of the resource availability.

The parent node additionally configures the child node with an offset for each combination of the first-type resource availability combination, the offset being a duration corresponding to one or more OFDM symbols. Alternatively, the offset is a duration corresponding to one or more slots.

The configuration signaling is as follows:

```
SoftIndicator ::=        SEQUENCE {
    sai-RNTI                        RNTI-Value,
    dci-PayloadSize                 INTEGER (1..maxSAI-DCI-PayloadSize),
    SoftAvailabilityCombinations    SEQUENCE (SIZE
(1..maxNrofSoftAvailabilityCombinationsPerSet)) OF SoftAvailabilityCombinationPerCell
    positionInDCI                   INTEGER(0..maxSAI-DCI-PayloadSize-1)
    ...
}
SoftAvailabilityCombinationPerCell ::=    SEQUENCE {
    cellId                          CellIndex
    softAvailabilityCombinationId   SoftAvailabilityCombinationId,
    softAvailability                SEQUENCE (SIZE
(1..maxNrofSoftAvailabilityPerCombination)) OF INTEGER (0..255)
    offset                          INTEGER(0..maxOffsetSize-1)
}
SlotFormatCombinationId ::=    INTEGER
(0..maxNrofSoftAvailabilityCombinationsPerSet-1)
```

The above signaling format configures an offset value for each combination. For example, an offset corresponding to a first-type or Soft resource availability combination with a combination ID of 1 is 1, and the unit is slot. Then the parent node notifies the child node that after receiving dynamic signaling with a combination ID of 1, the combination ID becomes valid after an offset of one slot.

Alternatively, an offset field may be moved from SoftAvailabilityCombination to SoftIndicator, and the parent node configures a common offset for all combinations of the child node.

Alternatively, the parent node may respectively configure different offsets for a plurality of cells corresponding to the child node, and different first-type resource availabilities of each cell use the same offset.

Alternatively, the parent node may configure a common offset for all child nodes, and each cell corresponding to the child node uses this common offset.

The offset may also be notified by dynamic signaling, a dynamic signaling index value indicates a first-type resource or Soft resource availability combination of one or more slots, and the dynamic signaling also carries an offset field for indicating that the indication signaling becomes valid after a certain time offset after the child node receives the indication signaling.

The amount of time represented by the offset field in the dynamic signaling may also be a pre-defined time amount configured by high-layer signaling. For example, the high-layer signaling has agreed on 8 offset time amounts, each offset time amount corresponds to an index value, and the offset field in the dynamic signaling notifies the child node of a specific offset time amount by an indication index value.

The parent node may alternatively indicate a duration for validation of the resource availability when indicating the first-type resource or Soft resource availability to the child node.

The parent node additionally configures the child node with a validation duration for each combination of the first-type resource availability combination, the validation duration being a duration corresponding to one or more OFDM symbols. Alternatively, the validation duration is a duration corresponding to one or more slots.

The validation duration may also be notified by dynamic signaling, a dynamic signaling index value indicates a first-type resource or Soft resource availability combination of one or more slots, and the dynamic signaling also carries a duration field for indicating a validation duration after the child node receives the indication signaling.

The amount of time represented by the validation duration field in the dynamic signaling may also be a pre-defined time amount configured by high-layer signaling. For example, the high-layer signaling has agreed on 8 offset time amounts, each offset time amount corresponds to an index value, and the offset field in the dynamic signaling notifies the child node of a specific offset time amount by an indication index value.

Exemplary Embodiment 14

According to the method described in Exemplary Embodiments 2, 4, 6, 7, and 9, the Child node receives a first-type resource or Soft resource availability combination configured by the parent node, which further includes an offset indication.

After receiving a first-type resource or Soft resource availability combination index indicated by the parent node and offsetting by the offset, the Child node determines the corresponding first-resource or Soft resource availability of one or more slots.

For example, the child node receives a combination index of 1 on slot k, the offset is one slot, and the combination index 1 corresponds to 2 consecutive slots. Intra-slot Soft resource AIs of these consecutive or non-consecutive slots are indexes [2, 4] in Table 2 respectively. In a case where the indication mode is a continuous indication, the child node determines that an AI of slot k+1 is 2, i.e., the first-type or Soft-type OFDM symbols in the first two OFDM symbols of slot k+1 are not available, and the remaining OFDM symbols are available if the remaining OFDM symbols are of the first type or Soft type. The child node determines that an AI of slot k+2 is 4, i.e., the first-type or Soft-type OFDM symbols in the first four OFDM symbols of slot k+2 are not available, and the remaining OFDM symbols are available if the remaining OFDM symbols are of the first type or Soft type.

The validity duration may alternatively be notified by a received dynamic signaling carrying a validity duration field, based on which the validation duration after the child node receives the dynamic signaling can be determined.

The offset or duration represented by the validation duration field in the dynamic signaling may also be a pre-defined time amount configured by high-layer signaling. For example, the high-layer signaling has agreed on 8 offset time amounts or durations, each offset time amount or duration corresponds to an index value, and the child node determines the offset time amount or validation duration of indication signaling by acquiring the index value of the offset or duration in the dynamic signaling.

The method for determining the offset and/or duration includes the following operations.

An offset is determined by receiving a first-type resource or Soft resource availability combination through the child node.

Alternatively, an offset is determined by receiving a first-type resource or Soft resource availability combination corresponding to a specific cell through the child node.

Alternatively, an offset is determined by receiving dynamic signaling of a Soft resource availability combination index through the child node.

Embodiment 3

The embodiment of the present disclosure provides a storage medium. The storage medium stores a computer program that, when executed, performs the operations in any one of the above method embodiments.

In some exemplary implementations of the present embodiment, the storage medium may be configured to store the computer program for performing the following operation S1.

In S1, availabilities of first-type resources of one or more slots are determined according to an agreed rule and/or according to a resource configuration signaling.

In some exemplary implementations of the present embodiment, the storage medium may include, but is not limited to, various media capable of storing a computer program such as a U disk, a ROM, a RAM, a mobile hard disk, a magnetic disk or an optical disc.

An embodiment of the present disclosure provides an electronic device, which includes a memory and a processor. The memory stores a computer program. The processor is configured to execute the computer program to perform the operations in any one of the above method embodiments.

In some exemplary implementations, the electronic device may further include a transmission device and an input/output device, where the transmission device is connected to the processor, and the input/output device is connected to the processor.

In some exemplary implementations of the present embodiment, the processor may be configured to perform the following operation S1 through the computer program.

In S1, availabilities of first-type resources of one or more slots are determined according to an agreed rule and/or according to a resource configuration signaling.

In some exemplary implementations, a specific example in the present embodiment may refer to the examples described in the above examples and exemplary implementation manners, and details are not described herein in the present embodiment.

It is apparent that those having ordinary skill in the art should understand that the above modules or operations of the present disclosure may be implemented by a general-purpose computing device, and they may be centralized on a single computing device or distributed on a network composed of multiple computing devices. In some exemplary implementations, they may be implemented with program codes executable by a computing device, so that they may be stored in a storage device and executed by the computing device, and in some cases, the operations shown or described may be performed in a different order than here, or they are separately made into individual integrated circuit modules, or multiple modules or operations therein are made into a single integrated circuit module for implementation. As such, the present disclosure is not limited to any particular combination of hardware and software.

The above is only the exemplary embodiments of the present disclosure, and is not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

Through the embodiments of the present disclosure, a first node determines availabilities of first-type resources of one or more slots according to an agreed rule and/or according to a resource configuration signaling, thereby solving the technical problem in the related art that the availability of resources is difficult to determine.

What is claimed is:
1. A resource determination method, comprising:
determining, by a first node, availabilities of soft resources of one or more slots according to a resource configuration signaling, wherein the resource configuration signaling comprises: a first resource configuration signaling and a second resource configuration signaling,
wherein the first resource configuration signaling comprises:
combinations of availabilities of soft resources of one or more slots;
first indexes corresponding to the combinations;
a cell index of a cell in a cell set corresponding to the first node; and
a position, in the second resource configuration signaling, of a first index corresponding to a combination of the availabilities of the soft resources of the one or more slots; and
wherein the second resource configuration signaling is sent by a second node and received by the first node, the first node extracts the first index from the corresponding position in the second resource configuration signaling, and determines, according to the extracted first index, a combination among the combinations in the first resource configuration signaling so as to determine the availabilities of the soft resources of the one or more slots of the cell in the cell set corresponding to the first node.

2. The method according to claim 1, wherein the combinations of the availabilities of the soft resources of one or more slots comprise at least one of the following:
   first combinations of the availabilities of the soft resources on different symbols within each slot of one or more slots under configuration of a Normal Cyclic Prefix (NCP) with third indexes corresponding to the first combinations of the availabilities of the soft resources on different symbols within each slot of one or more slots under configuration of an NCP;
   second combinations of the availabilities of the soft resources on different symbols within each slot of one or more slots under configuration of an Extended Cyclic Prefix (ECP) with fourth indexes corresponding to the second combinations of the availabilities of the soft resources on different symbols within each slot of one or more slots under configuration of an ECP; and
   third combinations of the availabilities of the soft resources on symbols of different transmission directions within each slot of one or more slots with fifth indexes corresponding to the third combinations of the availabilities of the soft resources on symbols of different transmission directions within each slot of one or more slots.

3. The method according to claim 1, wherein the combination of the availabilities of the soft resources of one or more slots comprises at least one of:
   the combination of the availabilities of the soft resources of one or more slots corresponding to the first node;
   the combination of the availabilities of the soft resources of one or more slots of the cell in the cell set corresponding to the first node; and
   the combination of the availabilities of the soft resources of one or more slots for one link of the first node or one link of the cell in the cell set corresponding to the first node.

4. The method according to claim 1,
   the method further comprises at least one of the following:
   the first node extracts an availability offset from a corresponding position of the second resource configuration signaling, and determines an offset for validation of the availabilities of the soft resources of one or more slots of the cell in the cell set corresponding to the first node; or,
   the first node extracts an availability duration from a corresponding position of the second resource configuration signaling, and determines a duration for validation of the availabilities of the soft resources of one or more slots of the cell in the cell set corresponding to the first node; or,
   the first node extracts an availability repeat indication from a corresponding position of the second resource configuration signaling, and determines a repeat indication for validation of the availabilities of the soft resources of one or more slots of the cell in the cell set corresponding to the first node.

5. The method according to claim 1, wherein the first node determines the availabilities of the soft resources of the one or more slots further according to an agreed rule, comprising at least one of the following:
   determining according to a corresponding relationship between the availabilities of the soft resources of one or more slots and an index value;
   in a case where the first node does not receive the resource configuration signaling, determining, by the first node, that the soft resources are not explicitly indicated as being available;
   receiving, by the first node, indication signaling and repeatedly applying, by the first node, the indication signaling to one or more subsequent slots until a new indication signaling is received;
   receiving, by the first node, indication signaling and validating, by the first node, the indication signaling for a duration, and in a case where a new indication signaling is not received after the expiration of the duration, determining, by the first node, subsequent soft resources are not explicitly indicated as being available;
   receiving, by the first node, indication signaling without repeatedly applying the indication signaling to one or more subsequent slots, and determining, by the first node, that soft resources of the one or more subsequent slots are not indicated as being available;
   determining according to a corresponding relationship between a pattern of the availabilities of the soft resources of one or more slots and an index value;
   in a case where the first node receives the second resource configuration signaling, determining to validate the second resource configuration signaling on a slot where the second resource configuration signaling is received; and
   in a case where the first node receives the second resource configuration signaling, determining to validate the second resource configuration signaling on a slot where the second resource configuration signaling is received and which contains soft resources, or to validate the second resource configuration signaling on a subsequent slot which is closest to a slot where the second resource configuration signaling is received and which contains soft resources,
   wherein the one or more slots are a validation slot or several consecutive slots starting from a validation slot, or a validation slot or a plurality of slots containing soft resources starting from a validation slot.

6. The method according to claim 5, wherein the first node determines the availabilities of the soft resources under an ECP according to an availability pattern under an NCP in one of following manners:
   in a case where two Orthogonal Frequency Division Multiplexing (OFDM) symbols under the NCP overlapping with an OFDM symbol under the ECP are both available, determining, by the first node, that the OFDM symbol under the ECP is available;
   in a case where one of two OFDM symbols under the NCP overlapping with an OFDM symbol under the ECP is available, determining, by the first node, that the OFDM symbol under the ECP is available;
   in a case where an OFDM symbol with a longer overlapping region in two OFDM symbols under the NCP overlapping with an OFDM symbol under the ECP is available, determining, by the first node, that the OFDM symbol under the ECP is available; and
   determining, by the first node, a combination of the availabilities of soft resources corresponding to S1 OFDM symbols of each slot in each combination of the availabilities according to one or more combinations of the availabilities corresponding to the first resource configuration signaling sent by a second node, wherein S1 is the number of OFDM symbols contained in one slot under configuration of ECP, and the first node ignores availabilities of OFDM symbols beyond S1 OFDM symbols.

7. A non-transitory computer-readable storage medium, storing a computer program that, when executed, performs the method according to claim 1.

8. An electronic device, comprising a memory and a processor, wherein the memory stores a computer program, and the processor is configured to execute the computer program to perform the method according to claim 1.

9. The method according to claim 1, wherein the first resource configuration signaling further comprises:
   combinations of the availabilities of the soft resources of one or more slots for one link of the first node or one link of a cell in a cell set corresponding to the first node;
   second indexes of the combinations of the availabilities of the soft resources of one or more slots for one link of the first node or one link of a cell in a cell set corresponding to the first node;
   a position, in the second resource configuration signaling, of the cell index; and p1 a position, in the second resource configuration signaling, of a second index corresponding to a combination of the availabilities of the soft resources of the one or more slots.

10. The method according to claim 9, wherein
   the first node extracts the cell index, or the second index from the corresponding position of the second resource configuration signaling, and determines the availabilities of the soft resources of one or more slots of the cell in the cell set corresponding to the first node, or the availabilities of the soft resources of one or more slots of one link of the first node or one link corresponding to the cell in the cell set corresponding to the first node;
   and the method further comprises at least one of the following:
   the first node extracts an availability offset from a corresponding position of the second resource configuration signaling, and determines an offset for validation of the availabilities of the soft resources of one or more slots of the cell in the cell set corresponding to the first node, or of the availabilities of the soft resources of one or more slots of one link of the first node or one link corresponding to the cell in the cell set corresponding to the first node; or,
   the first node extracts an availability duration from a corresponding position of the second resource configuration signaling, and determines a duration for validation of the availabilities of the soft resources of one or more slots of the cell in the cell set corresponding to the first node, or of the availabilities of the soft resources of one or more slots of one link of the first node or one link corresponding to the cell in the cell set corresponding to the first node; or,
   the first node extracts an availability repeat indication from a corresponding position of the second resource configuration signaling, and determines a repeat indication for validation of the availabilities of the soft resources of one or more slots of the cell in the cell set corresponding to the first node, or of the availabilities of the soft resources of one or more slots of one link of the first node or one link corresponding to the cell in the cell set corresponding to the first node.

11. A resource indication method, comprising:
   determining, by a second node, to indicate availabilities of soft resources to a first node by sending resource configuration signaling to the first node, wherein the resource configuration signaling comprises: a first resource configuration signaling and a second resource configuration signaling,
   wherein the first resource configuration signaling comprises:
      combinations of availabilities of the soft resources of one or more slots;
      first indexes corresponding to the combinations;
      a cell index of a cell in a cell set corresponding to the first node; and
      a position, in the second resource configuration signaling, of a first index corresponding to a combination of the availabilities of the soft resources of the one or more slots; and
   wherein the second resource configuration signaling carries the first index at the position indicated by the first resource configuration signaling, to indicate to the first node a combination among the combinations indicated by the first resource configuration signaling, so as to indicate the availabilities of the soft resources of the one or more slots of the cell in the cell set corresponding to the first node.

12. The method according to claim 11, wherein the combinations of the availabilities of the soft resources of one or more slots comprise at least one of the following:
   first combinations of the availabilities of the soft resources on different symbols within each slot of one or more slot under configuration of a Normal Cyclic Prefix (NCP) with third indexes corresponding to the first combinations of the availabilities of the soft resources on different symbols within each slot of one or more slot under configuration of an NCP;
   second combinations of the availabilities of the soft resources on different symbols within each slot of one or more slot under configuration of an Extended Cyclic Prefix (ECP) with fourth indexes corresponding to the second combinations of the availabilities of the soft resources on different symbols within each slot of one or more slot under configuration of an ECP; and
   third combinations of the availabilities of the soft resources on symbols of different transmission directions within each slot of one or more slots with fifth indexes corresponding to the third combinations of the availabilities of the soft resources on symbols of different transmission directions within each slot of one or more slots.

13. The method according to claim 11, wherein the combination of the availabilities of the soft resources of one or more slots is configured according to at least one of the following manners:
   being configured for the first node;
   being configured for a cell in a cell set corresponding to the first node; and
   being configured for one link of the first node or one link corresponding to a cell in a cell set corresponding to the first node.

14. The method according to claim 11, wherein
   the method further comprises at least one of the following:
   the second resource configuration signaling carries an availability offset for indicating of the availabilities of the soft resources of one or more slots of the cell in the cell set corresponding to the first node; or,
   the second resource configuration signaling carries an availability duration for indicating a duration for validation of the availabilities of the soft resources of one or more slots of the cell in the cell set corresponding to the first node; or, the second resource configuration signaling carries an availability repeat indication for indicating repeated validation of the availabilities of the soft resources of one or more slots of the cell in the cell set corresponding to the first node.

15. The method according to claim 11, wherein the second node indicates the availabilities of the soft resources further according to an agreed rule, comprising at least one of the following:

in a case where the second node does not send the resource configuration signaling to the first node, not explicitly indicating, by the second node, that the soft resources are available;

receiving, by the first node, indication signaling and repeatedly applying the indication signaling to one or more subsequent slots until a new indication signaling is received;

receiving, by the first node, indication signaling without repeatedly applying the indication signaling to one or more subsequent slots, and determining, by the first node, that soft resources of the one or more subsequent slots are not indicated as being available;

determining according to a corresponding relationship between a pattern of the availabilities of the soft resources of one or more slots and an index value;

receiving, by the first node, indication signaling, and determining, by the first node, to validate the indication signaling on a current slot; and receiving, by the first node, indication signaling, determining, by the first node, to validate the indication signaling on a slot closest to a current slot, and in a case where the current slot contains soft resources, determining, by the first node, to validate the indication signaling on the current slot.

16. The method according to claim 11, wherein the first node determines the availabilities of the soft resources under an ECP according to an availability pattern under an NCP in one of following manners:

in a case where two Orthogonal Frequency Division Multiplexing (OFDM) symbols under the NCP overlapping with an OFDM symbol under the ECP are both available, determining, by the first node, that the OFDM symbol under the ECP is available;

in a case where one of two OFDM symbols under the NCP overlapping with an OFDM symbol under the ECP is available, determining, by the first node, that the OFDM symbol under the ECP is available;

in a case where an OFDM symbol with a longer overlapping region in two OFDM symbols under the NCP overlapping with an OFDM symbol under the ECP is available, determining, by the first node, that the OFDM symbol under the ECP is available; and determining, by the first node, a combination of the availabilities of soft resources corresponding to S1 OFDM symbols of each slot in each combination of the availabilities according to one or more combinations of the availabilities corresponding to the first resource configuration signaling sent by the second node, wherein S1 is the number of OFDM symbols contained in one slot under configuration of ECP, and the first node ignores availabilities of OFDM symbols beyond S1 OFDM symbols.

17. A non-transitory computer-readable storage medium, storing a computer program that, when executed, performs the method according to claim 11.

18. An electronic device, comprising a memory and a processor, wherein the memory stores a computer program, and the processor is configured to execute the computer program to perform the method according to claim 11.

19. The method according to claim 11, wherein the first resource configuration signaling further comprises:

combinations of the availabilities of the soft resources of one or more slots for one link of the first node or one link of a cell in a cell set corresponding to the first node;

second indexes of the combinations of the availabilities of the soft resources of one or more slots for one link of the first node or one link of a cell in a cell set corresponding to the first node;

a position, in the second resource configuration signaling, of the cell index; and a position, in the second resource configuration signaling, of the second index corresponding to the combination of the availabilities of the soft resources of one or more slots.

20. The method according to claim 19, wherein the second resource configuration signaling carries the cell index, or the second index for indicating the combination of the availabilities of the soft resources of one or more slots of the cell in the cell set corresponding to the first node, or the combination of the availabilities of the soft resources of one or more slots of one link of the first node or one link corresponding to the cell in the cell set corresponding to the first node;

and the method further comprises at least one of the following:

the second resource configuration signaling carries an availability offset for indicating an offset for validation of the availabilities of the soft resources of one or more slots of the cell in the cell set corresponding to the first node, or of the availabilities of the soft resources of one or more slots of one link of the first node or one link corresponding to the cell in the cell set corresponding to the first node; or, the second resource configuration signaling carries an availability duration for indicating a duration for validation of the availabilities of the availabilities of the soft resources of one or more slots of the cell in the cell set corresponding to the first node, or of the availabilities of the soft resources of one or more slots of one link of the first node or one link corresponding to the cell in the cell set corresponding to the first node; or, the second resource configuration signaling carries an availability repeat indication for indicating repeated validation of the availabilities of the soft resources of one or more slots of the cell in the cell set corresponding to the first node, or of the availabilities of the soft resources of one or more slots of one link of the first node or one link corresponding to the cell in the cell set corresponding to the first node.

* * * * *